US007079364B2

(12) United States Patent
Butcher et al.

(10) Patent No.: US 7,079,364 B2
(45) Date of Patent: Jul. 18, 2006

(54) OVERLOAD STATUS INDICATOR FOR A REFRIGERATION UNIT

(75) Inventors: Ronald G. Butcher, Plainfield, IN (US); Larry J. Burkhart, Indianapolis, IN (US); Gary L. Clark, Zionsville, IN (US)

(73) Assignee: Scroll Technologies, Arkadelphia, AR (US)

( * ) Notice: Subject to any disclaimer, the term of this patent is extended or adjusted under 35 U.S.C. 154(b) by 603 days.

(21) Appl. No.: 09/963,772

(22) Filed: Sep. 26, 2001

(65) Prior Publication Data

US 2003/0058588 A1 Mar. 27, 2003

(51) Int. Cl.
*H02H 5/04* (2006.01)

(52) U.S. Cl. ........................................ 361/22; 361/23

(58) Field of Classification Search ................. 361/20, 361/22, 23, 24, 25, 26, 30, 103; 417/12, 417/18, 32; 62/127

See application file for complete search history.

(56) References Cited

U.S. PATENT DOCUMENTS

| | | | | | |
|---|---|---|---|---|---|
| 5,200,872 | A | * | 4/1993 | D'Entremont et al. | 361/25 |
| 5,618,361 | A | * | 4/1997 | Colussi et al. | 152/416 |
| 5,690,475 | A | * | 11/1997 | Yamada et al. | 417/32 |
| 5,975,854 | A | * | 11/1999 | Culp et al. | 417/18 |
| 6,206,073 | B1 | * | 3/2001 | Lay | 160/1 |
| 6,364,619 | B1 | * | 4/2002 | Williams et al. | 417/32 |
| 6,433,975 | B1 | * | 8/2002 | Satoh et al. | 361/23 |
| 6,495,982 | B1 | * | 12/2002 | Katsumata et al. | 318/471 |
| 6,501,629 | B1 | * | 12/2002 | Marriott | 361/22 |
| 6,615,594 | B1 | * | 9/2003 | Jayanth et al. | 62/126 |

* cited by examiner

*Primary Examiner*—Brian Sircus
*Assistant Examiner*—Danny Nguyen
(74) *Attorney, Agent, or Firm*—Carlson, Gaskey & Olds

(57) ABSTRACT

A compressor assembly comprises a compressor, a motor protector, and a signaling device. Upon an overload condition, the motor protector activates. The signaling device also activates to serve as an alert that the compressor is not malfunctioning but instead is in an overload condition.

11 Claims, 2 Drawing Sheets

OVERLOAD STATUS INDICATOR FOR A REFRIGERATION UNIT

BACKGROUND OF THE INVENTION

This application discloses and claims an overload status indicator for a compressor that signals an overload condition following the shut down of the compressor.

Scroll compressors are becoming widely utilized in refrigerant compression applications. In a scroll compressor a pair of scroll members each have a base and a generally spiral wrap extending from the base. The wraps interfit to define compression chambers. One of the two scroll members is caused to orbit relative to the other. As the wraps orbit relative to each other, the size of the compression chambers decreases and an entrapped refrigerant is compressed.

There are many challenges with scroll compressor design. One of the challenges relates to the mass flow through the compressor. The compressors are typically incorporated into a refrigerant cycle, and there is the possibility of loss of charge in the refrigerant from several spots in the cycle. During a loss of charge situation, the mass of refrigerant flowing through the compressor decreases. Continued operation at loss of charge situations can have undesirable side effects. Thus, there is an effort to identify loss of charge situations.

One protection element incorporated into compressors is a motor protector. A motor protector senses several variables within the compressor housing and stops operation of the electric motor driving the compressor should conditions indicate some problem with the compressor or its associated refrigerant cycle. Typically, the protector is actuated by an anomaly in the power supply to the electric motor (i.e., a spike in voltage or current) or, due to excessive heat. Motor protectors have been typically incorporated into the windings of the motor stator.

Individuals servicing these compressors frequently mistake a compressor in which a motor protector has been activated to be a malfunctioning compressor. Consequently, these compressors may be wrongly sent in for repair rather than allowing the overload condition to pass or the compressor to reset. Indeed, in some cases, the compressor may be replaced by another unit, resulting in further unnecessary cost and expense. Moreover, the activation of the motor protector may indicate a system wide problem such as loss of refrigerant charge or failed condenser fan motor. Accordingly, a technician may forego troubleshooting the refrigerant system, mistakenly believing a faulty compressor motor to be the problem.

Currently, to determine whether the compressor is in a temporary overload condition, a technician must measure the resistance between the motor common winding and run/start of the winding because of the motor protector's incorporation into the motor's windings. This analysis permits the technician to determine if the circuit has been broken as a consequence of activation of the motor protector. Due to the difficulty of performing this task, the technician may not take the time to conduct this analysis.

A need therefore exists for a simple and inexpensive device to signal that the compressor is in an overload condition.

SUMMARY OF THE INVENTION

The present invention provides a convenient and inexpensive signaling device that serves as an alert that an overload switch has been activated. The compressor assembly comprises a compressor, a motor, a motor protector, and a signaling device. The motor protector limits operation of the motor and activates upon a predetermined condition. Additionally, the signaling device also activates upon the meeting of the predetermined condition. The signaling device is positioned outside of the compressor housing. In this way, when the compressor reaches the predetermined condition, the signaling device serves as a signal that the compressor has met the predetermined condition and is not necessarily in need of repair, but rather the overload condition must be removed.

The motor protector is preferably a switch, such as an overload switch, in which activation of the switch activates the signaling device. The switch and signaling device may comprise a simple circuit, for example, a bi-metal switch and light circuit, such that when the switch shuts down the compressor, the switch diverts power from the motor to the light. The signal device could also be a simple terminal block with one or two blunt terminal posts. This type of signal could be used to measure continuity across the overload protector. Additionally, blunt posts, when applied correctly, would prevent the service technician from bypassing the overload protector with a jumper wire.

The predetermined condition may relate to an overload condition of the compressor. Accordingly, a compressor may have a limited range of operation. When the limited range of operation is reached, its operation is limited by a motor protector such as a shutoff switch. In contrast to the prior art, a signal is issued when the compressor is shut down to advise a technician of the correct condition of the compressor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
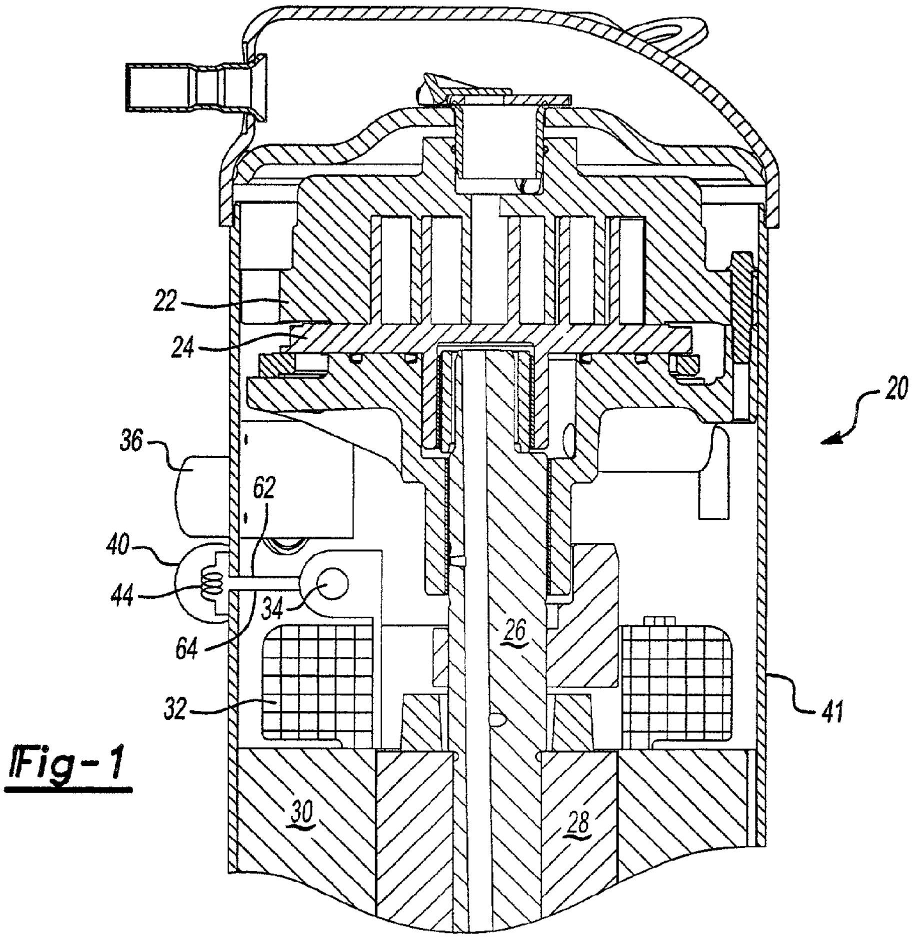
FIG. 1 shows an embodiment of the invention.
Figure 3:
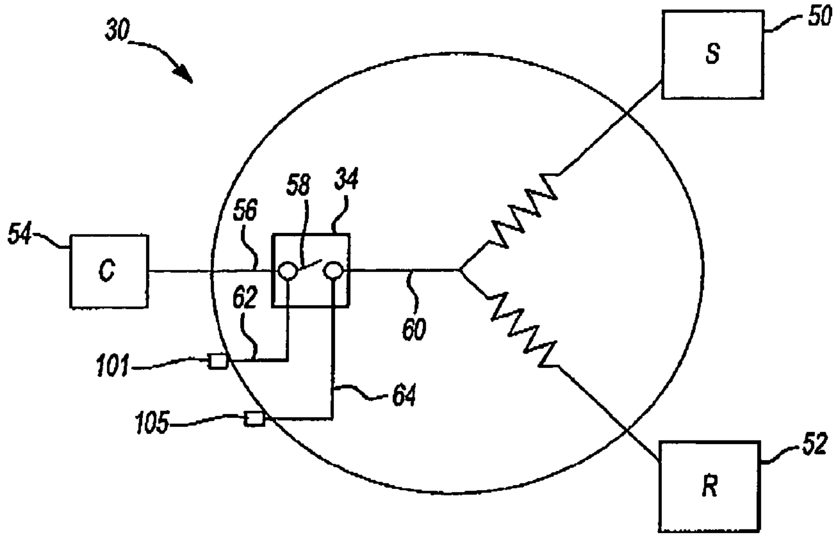
FIG. 3 shows terminal posts for a signaling device.

FIG. 1 shows a scroll compressor 20 incorporating a non-orbiting scroll 22 interfitting with an orbiting scroll 24. As is known, a shaft 26 drives the orbiting scroll 24. The shaft 26 is driven by a motor rotor 28 that is driven by a motor stator 30. As known, windings 32 on the stator 30 are associated with a motor protector 34. The motor protector 34 is shown schematically. Refrigerant enters a chamber surrounding the motor and protector through the suction tube 36. During operation of the scroll compressor shown in FIG. 1, the suction refrigerant entering the compressor through the suction tube 36 will pass over the protector 34 and its holder 35, cooling the protector. The purpose is to cool the motor. However, should the mass flow of refrigerant decrease, as would be the case in a loss of charge situation, then heat transfer will also decrease. At that time, the motor protector is likely to reach its trigger temperature—a predetermined condition that may be settable to the overload parameters of the motor. Reaching this condition stops operation of the motor. At this point, signaling device 40 activates, signaling the motor to be in an overload condition. As can be seen, the motor, scroll element and motor protector are all within a housing 41 whereas the signaling device 40 is positioned outwardly of the housing 41. Although not shown in this figure, there would need to be appropriate sealing to insure that the connection of the signaling device 40 is fluid type. The invention thereby serves as an alert that protector 34 has triggered, preventing the misdiagnosis of the motor or compressor as a malfunctioning unit. As shown in FIG. 1, signaling device 40 may be a lighting element 44 that illuminates upon the meeting of the predetermined condition, such as a trigger temperature. It could also be a terminal post or posts, a first terminal post 101 and a second terminal post 105 where the service technician could check the circuit continuity of the overload protector, as shown in FIG. 3.

Figure 2A:
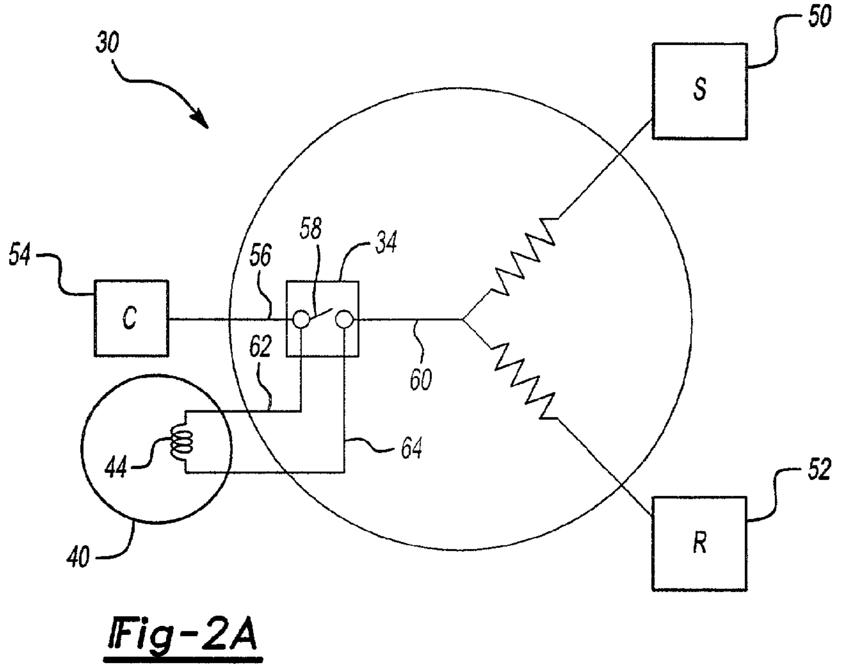
FIG. 2A shows a motor protector with the present invention.

Signaling device 40 may be activated and controlled by motor protector 34. FIG. 2A illustrates an embodiment of the invention. A single-phase motor (shown schematically), is wired to have start (50) and run (52) windings. A common line 54 supplies current to windings 50 and 52.

A common line 54 leads to a power supply 56 passing through the motor protector 34. A start winding and a run winding 50 and 52 respectively communicate with line 60 downstream of protector 34. As shown, a switch 58 within the motor protector 34 selectively is opened should conditions within the compressor indicate that motor operation should stop. In such an event, there is a short circuit between lines 56 and 60. This will cause current to flow through lines 62 and 64, and power the lamp 44. As mentioned, the lamp 44 will be mounted in some form of sealed connection such that the passage of the illuminating signal and device 40 through housing 41 will not cause any fluid leak.

Figure 2B:
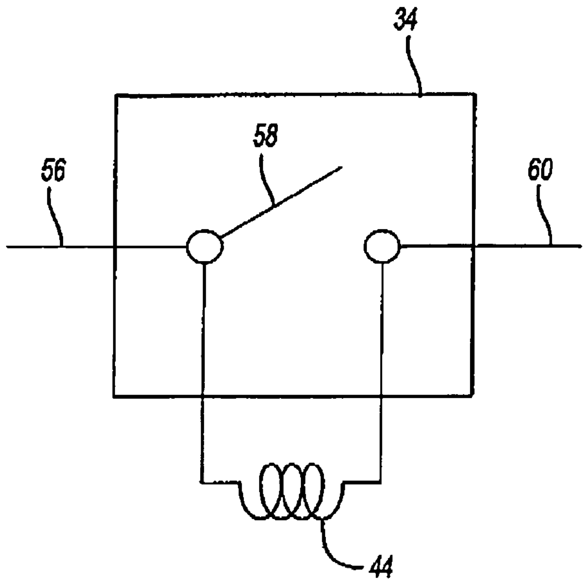
FIG. 2B shows a motor protector actuated to stop operation of the motor.

As shown in FIG. 2B, the switch 58 has opened. Thus, the light 44 will now be illuminated. If the switch 58 is closed, the path through the switch 58 is of less resistance then passing through the light 44. In such cases, the light 44 will not be illuminated. However, should the switch 58 open, as would be the case should temperatures within the compressor increase above a predetermined maximum, or should there be electrical anomalies in the power supply, then the switch 58 will open and the light 44 will become illuminated. Under such conditions, the light will stay illuminated until conditions change, such as by cooling of the temperature within a compressor, and such that the switch 58 can then re-close.

The present invention thus provides a way of indicating to a service repair person that the motor protector switch has opened to stop motor operation. This will provide a good indication to the repair person that a particular type of condition may have stopped compressor motor operation. Thus, the problems as mentioned above will be overcome.

While the motor protector is shown as triggering the signaling device, other "trigger" events could be utilized. As an example, compressors are often provided with valves which will open under certain conditions to allow hot refrigerant to contact a protector switch. The operation of such a valve could be utilized as a "trigger" for a signaling device. Moreover, while a scroll compressor is illustrated and disclosed, other types of compressors may benefit from this invention. Also, signaling devices other than a visual device, such as a light, may be utilized.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A compressor assembly comprising:

a compressor driven by a motor;

a motor protector for limiting operation of said motor and activatable upon a predetermined condition, said motor protector having a switch that limits operation of said motor upon said predetermined condition;

said compressor, said motor and said protector being within a compressor housing; and a signaling device for signaling the meeting of said predetermined condition to a location outside of said compressor housing wherein activation of said switch activates said signaling device by diverting power to said signaling device from said motor.

2. The compressor assembly of claim 1 wherein said switch is mounted electrically in parallel with said signaling device.

3. The compressor assembly of claim 1 wherein when said switch is open, current will flow to said signaling device.

4. The compressor assembly of claim 1 wherein said signaling device comprises a light.

5. The compressor assembly of claim 1 wherein said predetermined condition relates to an overload condition of said compressor.

6. The compressor assembly of claim 1 wherein said signaling device comprises a terminal post.

7. The compressor assembly of claim 1 wherein said compressor is a scroll compressor.

8. A compressor assembly comprising:

a compressor driven by a motor;

a protector for limiting operation of said motor and activatable upon a predetermined condition, said protector having a switch that limits operation of said motor upon said predetermined condition;

said compressor, said motor protector, and said switch being within a compressor housing; and a signaling device mounted electrically in parallel to said switch, said signaling device for signaling the meeting of said predetermined condition to a location outside said compressor housing by diverting power to said signaling device from said motor, wherein current flows to said signaling device when said switch is open.

9. The compressor assembly of claim 8 wherein said signaling device comprises a terminal post.

10. The compressor assembly of claim 9 wherein said terminal post comprises a first terminal post and a second terminal post, said first terminal post and said second terminal post forming a circuit with a switch of said protector, said switch for limiting operation of said motor upon said predetermined condition.

11. The compressor assembly of claim 10 wherein said first terminal post and said second terminal post form an open circuit with said switch when said switch is open.

* * * * *